(12) United States Patent
Dimanshteyn et al.

(10) Patent No.: US 8,153,034 B2
(45) Date of Patent: *Apr. 10, 2012

(54) FLEXIBLE PROTECTIVE COATING

(75) Inventors: Felix A. Dimanshteyn, West Hartford, CT (US); Richard J. Barone, Wilton, CT (US)

(73) Assignee: American Thermal Holding Company, Richmond Hill, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/224,003

(22) Filed: Sep. 1, 2011

(65) Prior Publication Data

US 2011/0313092 A1    Dec. 22, 2011

Related U.S. Application Data

(63) Continuation of application No. 11/212,319, filed on Aug. 25, 2005, now Pat. No. 8,029,704.

(51) Int. Cl.
C09K 21/02 (2006.01)
A62D 1/06 (2006.01)
C09D 5/18 (2006.01)

(52) U.S. Cl. ........ 252/604; 252/606; 252/607; 252/608; 252/609; 252/610; 252/611; 252/8.05; 106/18.11; 106/18.26

(58) Field of Classification Search .................. None
See application file for complete search history.

(56) References Cited

U.S. PATENT DOCUMENTS

| | | | |
|---|---|---|---|
| 2,452,054 A | 10/1948 | Jones et al. | |
| 2,452,055 A | 10/1948 | Jones et al. | |
| 2,523,626 A | 9/1950 | Jones et al. | |
| 2,566,964 A | 9/1951 | Scholz et al. | |
| 2,600,455 A | 6/1952 | Wilson et al. | |
| 2,684,953 A | 7/1954 | Stilbert, Jr. et al. | |
| 2,755,260 A | 7/1956 | Stilbert, Jr. et al. | |
| 3,021,293 A | 2/1962 | Simon | |
| 3,062,792 A | 11/1962 | McConnell et al. | |
| 3,422,046 A | 1/1969 | Thomas et al. | |
| 3,427,186 A * | 2/1969 | Hudson | 427/440 |
| 3,448,075 A | 6/1969 | Clark et al. | |
| 3,725,544 A * | 4/1973 | Raff et al. | 424/688 |
| 3,810,767 A * | 5/1974 | Raff et al. | 106/18.31 |
| 3,821,156 A * | 6/1974 | Farrar | 523/181 |
| 3,884,870 A * | 5/1975 | Dodson et al. | 523/220 |
| 3,955,987 A | 5/1976 | Schaar et al. | |
| 3,983,186 A | 9/1976 | Eilers et al. | |
| 3,983,296 A | 9/1976 | Purvis et al. | |
| 3,993,607 A | 11/1976 | Florence | |
| 4,017,657 A | 4/1977 | Foley et al. | |
| 4,042,556 A | 8/1977 | Yoshinaga | |
| 4,065,394 A | 12/1977 | Pratt et al. | |
| 4,110,062 A | 8/1978 | Summers | |
| 4,120,833 A | 10/1978 | Purvis et al. | |
| 4,144,385 A | 3/1979 | Downing et al. | |
| 4,322,170 A | 3/1982 | Papenmeier | |
| 4,341,694 A | 7/1982 | Halpern | |
| 4,444,969 A | 4/1984 | Younes | |
| 4,612,239 A | 9/1986 | Dimanshteyn | |
| 4,871,477 A | 10/1989 | Dimanshteyn | |
| 4,918,156 A * | 4/1990 | Rogers | 528/272 |
| 4,989,794 A * | 2/1991 | Askew et al. | 241/16 |
| 5,000,900 A | 3/1991 | Baumgartner | |
| 5,035,951 A | 7/1991 | Dimanshteyn | |
| 5,091,243 A | 2/1992 | Tolbert et al. | |
| 5,204,393 A | 4/1993 | Nalepa et al. | |
| 5,225,464 A | 7/1993 | Hill, Jr. | |
| 5,284,706 A * | 2/1994 | O'Donnelly | 428/330 |
| 5,324,461 A | 6/1994 | Grohman | |
| 5,378,753 A * | 1/1995 | Brown | 524/430 |
| 5,391,585 A | 2/1995 | Grohman | |
| 5,552,484 A | 9/1996 | Enomoto | |
| 5,603,990 A | 2/1997 | McGinniss et al. | |
| 5,686,025 A | 11/1997 | Martin | |
| 5,728,337 A | 3/1998 | Yoshikawa et al. | |
| 5,759,692 A | 6/1998 | Scholz et al. | |
| 5,783,613 A | 7/1998 | Beekman et al. | |
| 5,786,399 A | 7/1998 | Beekman et al. | |
| 5,865,003 A | 2/1999 | Klett et al. | |
| 5,935,879 A | 8/1999 | Helwig et al. | |
| 6,059,440 A | 5/2000 | Fuchs | |
| 6,093,485 A | 7/2000 | Jaffee | |
| 6,133,360 A * | 10/2000 | Barren et al. | 524/431 |
| 6,179,460 B1 | 1/2001 | Nurkhardt et al. | |
| 6,225,365 B1 | 5/2001 | Zerafati et al. | |
| 6,284,861 B1* | 9/2001 | Takuman et al. | 528/31 |
| 6,316,118 B1 | 11/2001 | Watanabe et al. | |
| 6,350,400 B1 | 2/2002 | Piotrowski | |
| 6,503,425 B1 | 1/2003 | Thorbjörnsson et al. | |
| 6,548,155 B1 | 4/2003 | Jaffee | |

(Continued)

FOREIGN PATENT DOCUMENTS

BE    669341 A    3/1966

(Continued)

OTHER PUBLICATIONS

ASTM, "Surface burning characteristics of building materials," Annual Book of ASTM Standards, 4 (7) (Nov. 2004).
British Plastics Federation, PVC in Fires (2nd ed.) (Apr. 1996).
Buganjy et al., "The origin and nature of flame retardance in ethylene-vinyl acetate copolymers containing Hostaflam AP 750," Polymer International, 48: 264-270 (1999).
Dey et al., "Inert gas extrusion of rigid PVC foam," Journal of Vinyl and Additive Technology, 2 (1): 48-52 (Mar. 1996).
Hilado, Flammability Handbook for Plastics (Technomis, Stamford, CT, 1969).
Lyons, The Chemistry & Uses of Fire-Retardants, Chapter 7, 297-301 (Wiley & Sons, 1970).
Rauwendaal, "Polymer extrusion," (Hanser Publishers, New York, 1986).

(Continued)

*Primary Examiner* — Joseph D Anthony
(74) *Attorney, Agent, or Firm* — Leydig, Voit & Mayer, Ltd.

(57) ABSTRACT

A composition made up of an inorganic fire-retardant having at least a bimodal distribution of particle sizes.

14 Claims, No Drawings

U.S. PATENT DOCUMENTS

| | | | |
|---|---|---|---|
| 6,564,437 B2 | 5/2003 | Meng et al. | |
| 6,609,819 B2 | 8/2003 | Hauck et al. | |
| 6,613,391 B1 | 9/2003 | Gang | |
| 6,632,442 B1 | 10/2003 | Chyall et al. | |
| 6,688,217 B2 | 2/2004 | Hauck et al. | |
| 6,706,793 B2 | 3/2004 | Abu-Isa et al. | |
| 6,706,820 B2 | 3/2004 | Kumaki et al. | |
| 6,743,742 B1 | 6/2004 | LaRocco et al. | |
| 6,790,893 B2 | 9/2004 | Nguyen et al. | |
| 6,919,398 B1* | 7/2005 | Born et al. | 524/493 |
| 6,924,233 B1* | 8/2005 | Chua et al. | 438/678 |
| 8,029,704 B2* | 10/2011 | Dimanshteyn et al. | 252/604 |
| 2002/0045010 A1* | 4/2002 | Rohrbaugh et al. | 427/372.2 |
| 2003/0124474 A1* | 7/2003 | Elliott et al. | 431/35 |
| 2003/0152776 A1* | 8/2003 | Kiuchi et al. | 428/413 |
| 2004/0258767 A1* | 12/2004 | Leach et al. | 424/630 |
| 2005/0085565 A1* | 4/2005 | Hintze-Bruning et al. | 523/220 |
| 2005/0118280 A1* | 6/2005 | Leach et al. | 424/617 |
| 2005/0249812 A1* | 11/2005 | Leach et al. | 424/489 |
| 2005/0265893 A1* | 12/2005 | Leach et al. | 422/40 |
| 2006/0135704 A1* | 6/2006 | Vallance et al. | 525/391 |
| 2006/0217479 A1* | 9/2006 | Ohkoshi et al. | 524/436 |
| 2006/0257578 A1* | 11/2006 | Zhang et al. | 427/393.3 |
| 2006/0269583 A1* | 11/2006 | Garst et al. | 424/405 |
| 2006/0288904 A1* | 12/2006 | Leach et al. | 106/15.05 |
| 2007/0045598 A1 | 3/2007 | Dimanshteyn et al. | |
| 2007/0246693 A1* | 10/2007 | Herbiet et al. | 252/609 |

FOREIGN PATENT DOCUMENTS

| | | |
|---|---|---|
| EP | 735119 B1 | 10/1996 |
| GB | 874762 A | 8/1961 |
| GB | 978623 A | 12/1964 |
| GB | 1217041 A | 12/1970 |
| JP | 52-000078 B | 1/1977 |

OTHER PUBLICATIONS

Scharf et al., "Studies on flame retardant intumescent char: Part I," Safety Journal, 19 (1): 103-117 (1992).

Stevens, Extruder Principals and Operations (Elsevier Application Science Publishers, New Yor,kk, 1985).

White, Twin Screw Extrustion: Technology and Principles (Hanser Publishers, New York, 1991).

* cited by examiner

FLEXIBLE PROTECTIVE COATING

This application is a continuation of Ser. No. 11/212,319 filed Aug. 25, 2005 now U.S. Pat. No. 8,029,704.

FIELD OF INVENTION

The invention relates generally to fire-retardant, smoke-suppressing compositions. More particularly the invention relates to fire-retardant, smoke-suppressing compositions that can be applied to a substrate.

BACKGROUND OF THE INVENTION

Numerous approaches have been developed to protect flammable substrates from fire. One approach that has found widespread utility is the application of fire-retardant coatings to the substrate. Fire-protective coatings may be broadly classified as ceramic-based coatings, ablative coatings, intumescent coatings, and vapor-producing (sublimation) coatings, although in practice there may be substantial overlap of the chemical and physical fire-retarding mechanism between these approaches.

Many conventional fire-retardant coatings employ agents which release non-flammable gases in response to heat or flame. For example, halogenated fire-retardants release gaseous acids, such as hydrobromic or hydrochloric acid, which retard burning by scavenging oxygen radicals. However, environmental and health concerns over halogenated flame retardant chemicals, such as brominated organic polymers, has led to an renewed emphasis on inorganic flame-retardants.

Alumina trihydrate ("ATH") is an inorganic flame retardant defined by the chemical formula $Al_2O_3.3H_2O$. In the presence of heat from fire, ATH endothermically releases its water of hydration which comprises 35% of the molecular weight of ATH. The endothermic reaction helps to cool the substrate below its flash point. The liberated water also provides a vapor barrier which shields the substrate from oxygen needed for combustion.

There are certain drawbacks to conventional coatings containing ATH and other inorganic fire-retardants. For example, due to the high levels of inorganic fire-retardant required to impart acceptable fire-retardancy, the coatings are typically rigid and therefore not suitable for application to highly flexible substrates. Cracking and checking of the coating frequently results when the underlying substrate is deformed, thereby diminishing the protective ability of the coating, exposing the substrate to the elements, and detracting from the visual appearance of the article.

Accordingly, there is a need in the art for highly flexible fire-retardant coatings. Further, there is a need in the art for highly flexible fire-retardant coatings comprising inorganic fire-retardants in quantities sufficient to retard or resist combustion of a substrate. There is also a need in the art for highly flexible fire-retardant coatings comprising inorganic fire-retardants in quantities sufficient to retard or resist combustion of a substrate which further protect the substrate or under-coating from water damage and the like.

SUMMARY OF THE INVENTION

In accordance with the foregoing objectives and others, the present invention overcomes the deficiencies in conventional fire-retardant coatings by providing fire-retardant, smoke-suppressing coatings comprising inorganic fire-retardants which are ideally suited for application to flexible substrates such as pipes, tubing, cabling and the like. Coatings using variants of the claimed compositions do not crack or check when the substrate is deformed, for example, by bending. Some variant coatings have excellent adhesive properties and can be applied directly to a substrate, including for example, metal, plastic, and wood, or may be applied over one or more under-coatings. Some variant coatings are water-resistant and therefore protect the substrate or under-coating against the elements and prevent leaching of the inorganic fire-retardants from the coating.

Some variants of the compositions claimed herein involve (a) between about 5% and about 30% by weight of an aqueous dispersion of polymeric binder; (b) between about 30% and about 90% by weight of a water-dispersible inorganic fire-retardant having a median particle diameter between about 15 and about 100 microns; and (c) between about 0.1% and about 10% by weight of a surfactant.

Other variants of the compositions claimed herein involve an inorganic fire-retardant having at least a bimodal distribution of particle sizes comprising a first powder of inorganic fire-retardant having first median particle diameter and a second powder of inorganic fire-retardant having a second median particle diameter; wherein the second median particle diameter is larger than the first median particle diameter.

Still other variant compositions claimed herein involve an inorganic fire-retardant, the inorganic fire-retardant having at least a bimodal distribution of particle sizes comprising a first powder of inorganic fire-retardant having first median particle diameter between about 0.1 and about 20 microns and a second powder of inorganic fire-retardant having a second median particle diameter between about 5 and about 100 microns; with the proviso that the second median particle diameter is larger than the first median particle diameter; and wherein the weight ratio of the first powder to the second powder is about 100:1 to about 1:20. It should be understood that in such variants, the first and second inorganic fire-retardant powders are not necessarily the same compound, although, in some, they will be the same. Some sub-variants of these compositions can comprise at least about 30% by weight inorganic fire-retardant.

Some exemplary variants of either of the above compositions will comprise at least about 60% by weight, at least about 70% by weight, at least about 80% by weight, or at least about 90% by weight inorganic fire-retardant.

The polymeric binder imparts flexibility to the above-referenced variant coatings even at very high levels of inorganic fire-retardant.

Particular variants of the inorganic fire-retardant may involve, for example, an inorganic oxide having water of hydration, such as alumina trihydrate, hydrated magnesium oxide, and hydrated zinc borate.

Yet other variants claimed herein involve a fire-retardant coating composition involving (a) alumina trihydrate having at least a bimodal distribution of particle sizes comprising a first alumina trihydrate powder having a median particle diameter between about 0.1 and about 5 microns and a second alumina trihydrate powder having a median particle diameter between about 20 and about 100 microns; wherein the weight ratio of the first powder to the second powder is about 5:1 to about 1:5; and (b) an aqueous dispersion of a latex binder; wherein the alumina trihydrate comprises at least about 30% by weight of the composition.

These and other aspects of the present invention will become apparent to those skilled in the art after reading the following detailed description.

The advantages and features described herein are a few of the many advantages and features available from representative examples and variants and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. In addition, different permutations and combinations beyond those expressly set forth should be understood to exist and can be created based upon the description provided herein without exhaustive recitation. Thus, this summary of features and advantages should not be considered dispositive in determining equivalence. Additional features and advantages of the invention will become apparent in the following description and from the claims.

DETAILED DESCRIPTION

The present invention provides coatings in the form of water-based compositions comprising an inorganic fire-retardant and a polymeric binder which in various embodiments are fire-retardant, fire-resistant, and fire-extinguishing. The coatings are water-resistant and highly flexible. In contrast to conventional coatings, the inventive coatings are resistant to cracking and checking when the substrate to which they are applied is deformed, such as by example bending or stretching. The coatings of the invention are also water-resistant which further serves to protect a substrate or undercoating from water damage and helps preserve the efficacy of the inorganic fire-retardant in the coating.

As used herein, all terms are intended to have their ordinary meaning in the art unless explicitly defined. The term "fire-retardant" refers to the ability of a material to retard the progression of combustion once ignited. The term "fire-resistant" refers to the ability of a material to resist combustion in the presence of heat of flame. The term "fire-extinguishing" refers to the ability of a material to self-extinguish upon combustion. The term "bimodal" refers to a particle size distribution having two maxima. The term "trimodal" refers to a particle size distribution having three maxima. All percentages and ratios are provided on a weight basis unless otherwise specified herein.

The compositions of the invention comprise a polymeric binder. In the broadest aspect of the invention, it is contemplated that any polymeric binder may be employed, including thermoplastic and thermosetting polymers. In one embodiment, the polymeric binder is a water-dispersible polymer, including but not limited to latex binders. The polymeric binder may be provided, for example, as an aqueous colloidal dispersion of polymer particles having particles diameters between about 0.01 microns and about 10 microns. Within this range, polymer particles having average particle diameters between about 0.05 microns and about 1 micron are especially suitable.

With regard to the aforementioned latex binders, the skilled artisan will recognize that the term "latex" is used in its broadest sense to refer to a colloidal suspension of polymeric particles and embraces without limitation natural latex, neoprene latex, nitrile latex, acrylic latex, vinyl acrylic latex, styrene acrylic latex, styrene butadiene latex, and the like. Exemplary polymers for these latex compositions include, but are not limited to, methyl methacrylate, styrene, methacrylic acid 2-hydroxyethyl acrylate polymer (CAS #70677-00-8), acrylic acid, methyl methacrylate, styrene, hydroxyethyl acrylate, butyl acrylate polymer (CAS #7732-38-6), butyl acrylate, methyl methacrylate, hydroxyethyl acrylate polymer (CAS #25951-38-6), butyl acrylate, 2-ethylhexyl acrylate, methyl methacrylate, acrylic acid polymer (CAS #42398-14-1), styrene, butylacrylate polymer (CAS #25767-47-9), butyl acrylate, 2-ethylhexyl acrylate, methacrylic acid polymer C(CAS #31071-53-1), acrylic polymers, and carboxylated styrene butadiene polymers. Combinations of more than one latex binder are also contemplated to be useful in the practice of the invention.

Special mention may be made of acrylic latex binders, such as those sold by The Dow Chemical Company under the name UCAR™ Latex. Suitable acrylic latex binders include, but are not limited to, UCAR™ Latex 120 (an acrylic latex binder material comprising about 48% by weight of an acrylic polymer, 52% by weight water, and 0.14% by weight ammonia, having has a total solids content of 50% by weight, viscosity of about 200 cps, a bimodal particle size distribution, and a glass transition temperature, midpoint, of about −3° C.); UCAR™ Latex 9037 (an acrylic copolymer emulsion product comprising about 52% by weight butyl acrylate, methyl methacrylate, hydroxyethyl acrylate polymer (CAS #25951-38-6), 48% by weight water, and 0.1% by weight ammonia, having a total solids content of 51.5% by weight, viscosity of about 450 cps, average particle size of about 0.3 microns, and a glass transition temperature, midpoint, of about −30° C.); UCAR™ Latex 9042 (an acrylic copolymer emulsion product comprising about 54% by weight butyl acrylate, methyl methacrylate, hydroxyethyl acrylate polymer (CAS #25951-38-6), 45% by weight water, and 0.12% by weight ammonia having a total solids content of 55.5% by weight, viscosity of about 500 cps, average particle size of about 0.3 microns, and a glass transition temperature, midpoint, of about −35° C.); UCAR™ Latex 9043 (an acrylic copolymer emulsion product containing about 54% by weight butyl acrylate, 2-ethylhexyl acrylate, methyl methacrylate, acrylic acid polymer (CAS #42398-14-1), 47% by weight water, 0.2% by weight ammonia, and 0.01% by weight 2-ethylhexylacrylate (CAS #103-11-7) having a total solids content of 53% by weight, viscosity of about 175 cps, average particle size of about 0.3 microns, and a glass transition temperature, midpoint, of about −40° C.); UCAR™ Latex 9181 (an acrylic copolymer emulsion product comprising about 56% by weight butyl acrylate, 2-ethylhexyl acrylate, methyl methacrylate, acrylic acid polymer (CAS #42398-14-1), 44% by weight water, 0.1% by weight ammonia, and 0.01% by weight 2-ethylhexylacrylate (CAS #103-11-7) having a total solids content of 56.5% by weight, viscosity of about 450 cps, average particle size of about 0.2 microns, and a glass transition temperature, midpoint, of about −40° C.); UCAR™ Latex 9188 (an acrylic copolymer emulsion comprising about 58% by weight styrene, butylacrylate polymer (CAS #25767-47-9) and 42% by weight water and having a total solids content of 57.3% by weight, viscosity of about 230 cps, average particle size of about 0.26 microns, and a glass transition temperature, midpoint, of about −29° C.); UCAR™ Latex 9189 (an acrylic copolymer emulsion product containing about 53% by weight butyl acrylate, methyl methacrylate, hydroxyethyl acrylate polymer (CAS #25951-38-6), 47% by weight water, and 0.12% by weight ammonia having a total solids content of 52.5% by weight, viscosity of about 325 cps, average particle size of about 0.24 microns, and a glass transition temperature, midpoint, of about −35° C.); UCAR™ Latex 9191 (an acrylic copolymer emulsion comprising about 39% by weight butyl acrylate, methyl methacrylate, hydroxyethyl acrylate polymer (CAS #25951-38-6), 48% by weight water, 13% by weight of an aqueous dispersion of modified rosin (CAS #8050-31-5), and 0.08% by weight ammonia and having a total solids content of 52.5% by weight, viscosity of about 250 cps, and a glass transition temperature, midpoint, of about −30° C.); UCAR™ Latex 9569 (an acrylic copolymer emulsion product containing about 58% by weight butyl acrylate, 2-ethylhexyl acrylate, methacrylic acid polymer C(CAS #31071-53-1), 42% by weight water, 0.08% by weight 2-ethylhexyl acrylate (CAS #103-11-7), 0.06% by weight ammonia, and 0.01% by weight 1,4-dioxane and having a total solids content of 57.5% by weight, viscosity of about 900 cps, average particle size of about 0.3 microns, and a glass transition temperature, midpoint, of about −53° C.).

Styrene acrylic latexes include, but are not limited to, UCAR™ Latex 100 (a styrene acrylic latex comprising about 62% by weight butyl acrylate, methyl methacrylate, styrene, methacrylic acid 2-hydroxyethyl acrylate polymer (CAS #70677-00-8), 38% by weight water, and 0.04% by weight ammonia and having a total solids content of 62% by weight, viscosity of about 750 cps, average particle size of about 0.3 microns, and a glass transition temperature, midpoint, of about 12° C.) and UCAR™ Latex 462 (a styrene acrylic latex binder comprising about 45.5% by weight acrylic acid, methyl methacrylate, styrene, hydroxyethyl acrylate, butyl acrylate polymer (CAS #7732-38-6) and about 54% by weight water and having a total solids content of 45.5% by weight, viscosity of about 400 cps, average particle size of about 0.35 microns, and a glass transition temperature, midpoint, of about 17° C.).

Styrene butadiene latexes include, but are not limited to, UCAR™ Latex DL313 (a styrene butadiene latex comprising 48% by weight of a carboxylated styrene butadiene polymer and 52% by weight water having a total solids content of 48% by weight, viscosity of about 300 cps, average particle size of about 0.1 microns, and a glass transition temperature, midpoint, of about −1° C.).

Vinyl acrylic latexes include, but are not limited to, UCAR™ Latex 162 (a vinyl acrylic copolymer latex binder comprising about 55% by weight vinyl acetate, butyl acrylate polymer (CAS #25067-01-0), 45% by weight water, less than 0.1% by weight vinyl acetate, 0.04% by weight acetaldehyde, 0.01% by weight formaldehyde and having a total solids content of 55% by weight, viscosity of about 400 cps, average particle size of about 0.3 microns, and a glass transition temperature, midpoint, of about 12° C.) and UCAR™ Latex 357 (a vinyl acrylic copolymer latex binder comprising about 56% by weight vinyl acetate, butyl acrylate polymer (CAS #25067-01-0), 44% by weight water, less than 0.08% by weight vinyl acetate, 0.04% by weight acetaldehyde, 0.01% by weight ammonia and having a total solids content of 56.5% by weight, viscosity of about 400 cps, average particle size of about 0.3 microns, and a glass transition temperature, midpoint, of about 23° C.).

Particular mention may be made of UCAR™ Latex 9042. The adhesive properties of UCAR™ Latex 9042 are characterized by: a 180° Peel, 30-minute dwell, pli of 3.5, a Quick Stick Adhesion, pli of 1.5, and Shear Resistance, on stainless steel, hours (½"×½"×500 g) of 9.0, as tested on 2-mil polyester backing at a coat weight of 1.6-1.8 g/100 in², 73° F.

The compositions of the invention comprise an inorganic fire-retardant. In the broadest aspects of the invention, any inorganic fire-retardant may be employed. Such inorganic fire-retardants are well-known in the art and include, without limitation, certain phosphate salts such as ammonium polyphosphate, $(NH_4PO_3)_n$, metal oxides, borates, and the like. In one implementation of the invention, the inorganic fire-retardant is one which undergoes an endothermic reaction in the presence of heat or flame (an "endothermic inorganic fire-retardant"). Crystalline materials having water of hydration are one interesting example of endothermic inorganic fire-retardants. Suitable inorganic materials comprising water of hydration include, for example, crystalline oxides such as alumina trihydrate, hydrated magnesium oxide, and hydrated zinc borate, including but not limited to $2ZnO.3B_2O_3.3½H_2O$, $4ZnO.B_2O_3.H_2O$, $4ZnO.6B_2O_3.7H_2O$, and $2ZnO.2B_2O_3.3H_2O$. Special mention may be made of alumina trihydrate. It will be understood that the term "oxide," as used herein, refers to inorganic substances comprising at least one atom which forms at least one double bond to oxygen, and includes substances having one atom double bonded to oxygen, for example MgO, and substances having two or more atoms double bonded to oxygen, for example zinc borate. The term "hydrated" refers to any substance which includes water in the crystalline state, i.e., water of crystallization, and is used synonymously herein with the term "water of hydration."

It has been observed that when particulate inorganic fire-retardants which are water-insoluble or poorly water-soluble having relatively large particle diameters (e.g., >20 microns) are formulated into an aqueous coating system, there is a tendency for the particulate inorganic fire-retardants to separate from the aqueous phase upon lengthy periods of storage. When this occurs, the sediment must be re-suspended, often with great difficulty, before applying the coating system to a substrate. This undesirable characteristic is overcome by employing particulate inorganic fire-retardant particles having a relatively small median particle diameter (e.g., <20 microns), alone or in combination with larger diameter particles of the inorganic fire-retardant. In particular, it has been found that very small particles, on the order of about 0.1 to about 5 microns, remain suspended in aqueous solution for extended periods of time, at least several days and preferably several weeks or more, without appreciable sedimentation. Coating systems formulated with such small particle diameter inorganic fire-retardants may therefore be employed without the need for laborious shaking, stirring, etc.

Accordingly, one embodiment of the invention provides compositions comprising inorganic fire-retardant powders having a median particle diameter of about 0.1 to about 5 microns. Within this range, inorganic fire-retardant powders having a median particle diameter of about 1 to about 3 microns are contemplated to by especially useful. Particular mention may be made of inorganic fire-retardant powders having a median particle diameter of about 2 microns. It is within the skill in the art to provide such powders having various particle sizes between 0.1 and 100 microns by disc milling, air-jet milling, grinding, and the like. These small diameter powders can be added to aqueous solutions in relatively large quantities (e.g., >30% by weight) as compared to larger diameter powders. The fire-retarding and fire-extinguishing benefits of the coating system are most fully realized when high levels of inorganic fire-retardant are present, particularly levels greater than 30% by weight of the total aqueous composition.

While the foregoing embodiments are contemplated to be useful for formulating many interesting coating systems of the invention, further improvement in the fire-retardant and fire-extinguishing characteristics of the coatings are achieved by employing a bimodal distribution of particulate inorganic fire-retardant. In one embodiment according to this aspect of the invention, compositions are provided comprising a first inorganic fire-retardant powder having a first median particle diameter and a second inorganic fire-retardant powder having a second median particle diameter. The first median particle diameter is selected such that the inorganic fire-retardant powder is capable of forming a colloidal suspension in aqueous solution which does not readily precipitate from the aqueous phase. The first median particle diameter is typically, although not necessarily, be between about 0.1 microns and about 20 micron, although typically it will be between about 0.1 to about 10 microns, or about 0.1 to about 5 microns, and suitably between about 1 to about 3 microns. Inorganic fire-retardant powders having a median particle diameter of about 2 microns have been found to be particularly interesting when employed as the first inorganic fire-retardant powder. The second inorganic fire-retardant powder is a relatively larger powder than the first inorganic fire-retardant powder. It has been observed that larger powders provide a more substantial barrier against heat and fire. Thus, the presence of larger particles provides a more robust coating and imparts a longer duration of protection to the coating. However, the diameter of the second powder should not be so large such that the material readily forms a sediment when formulated in an aqueous coating system. There is substantial leeway in the selection of the second powder because, in the broadest aspects of the invention, it is an optional expedient. The skilled artisan will be guided by the foregoing principles when selecting a preferred second particle diameter. The second median particle diameter is typically, though not necessarily, between about 5 microns and about 100 microns. In one embodiment the second median particle diameter is between about 10 microns and about 70 microns. In another embodiment the second median particle diameter is between about 20 microns and about 60 microns. Particularly useful coatings comprise a second inorganic fire-retardant powder having a median particle diameter between about 40 and about 50 microns, such as, for example, about 45 microns.

It has surprisingly been found that the larger second inorganic fire-retardant powders will remain suspended in an aqueous solution when the smaller inorganic fire-retardant powders are also present. It is contemplated that sedimentation of the larger second powder will be retarded or substantially prevented across a broad range of relative proportions between the two powders. For example, the weight ratio of the first inorganic fire-retardant powder to the second inorganic fire-retardant powder will typically, though not necessarily, be about 100:1 to about 1:20. The fire-retardant and fire-extinguishing properties of the compositions will be enhanced when the weight ratio of the first inorganic fire-retardant powder to the second inorganic fire-retardant powder is about 5:1 to about 1:20. Other embodiments will comprise a weight ratio of about 10:1 to about 1:10, about 5:1 to about 1:5, and about 1:1 to about 1:5. A weight ratio of 1:3 has been found to be particularly useful.

One interesting embodiment of the invention comprises a first inorganic fire-retardant powder having a median particle size of about 1 to about 3 microns, and particularly about 2 microns, and a second inorganic fire-retardant having a median particle size of about 40 to about 50 microns, and particularly about 45 microns.

In another interesting embodiment of the invention, trimodal distributions of particulate inorganic fire-retardants are employed. The compositions according to this embodiment will comprise a first inorganic fire-retardant powder having a first median particle diameter, a second inorganic fire-retardant powder having a second median particle diameter, and a third inorganic fire-retardant powder having a third median particle diameter. The first and third inorganic fire-retardant powders are selected as described above for the bimodal compositions. The second inorganic fire-retardant powder is provided having a median particle size intermediate between the first and third median particle diameters. The second inorganic fire-retardant powder will typically, though not necessarily, have a median particle size between about 5 microns and about 20 microns. Within this range, second inorganic fire-retardant powders having a median particle diameter between about 5 and about 15 microns are contemplated to be useful. In one embodiment contemplated to be useful, the second inorganic fire-retardant powder has a median particle size of about 9 microns.

In one implementation of the invention the inorganic fire-retardant powder is alumina trihydrate. The commercially available 2 micron alumina trihydrate powder MICRAL® 932 (J. M. Huber Corp.) has been found useful as the first powder in the bimodal and trimodal embodiments described above. MICRAL® 932 is a high surface area ultrafine alumina trihydrate having a typical chemical analysis of $Al_2O_3$ (64.9%), $SiO_2$ (0.005%), $Fe_2O_3$ (0.007%), total $Na_2O$ (0.3%), soluble $Na_2O$ (0.12%), 34.6% loss on ignition (550° C.), and 0.8% free moisture (105° C.). MICRAL® 932 is characterized by a median particle diameter of 2 microns, 100% passage through a 325 mesh sieve, and a surface area of 13 $m^2$/gm as measured with a Quantachrome monosorb surface area analyzer. The second alumina trihydrate powder (in bimodal embodiments) and the third alumina trihydrate powder (in trimodal embodiments) suitably have a median particle size of about 45 microns. Alumina trihydrate powder having a median diameter of 45 microns is commercially available under the name Onyx Elite® 100 (J.M. Huber Corp.). Onyx Elite® 100 is an alumina trihydrate having a typical chemical analysis of $Al_2O_3$ (65%), $SiO_2$ (0.008%), $Fe_2O_3$ (0.004%), total $Na_2O$ (0.2%), soluble $Na_2O$ (0.015%), 34.6% loss on ignition (550° C.), and 0.1% free moisture (105° C.). This alumina trihydrate powder is characterized by a median particle diameter of 45 microns, a surface area of 0.75 $m^2$/gm as measured as measured with a Quantachrome monosorb surface area analyzer, and the following screen analysis: 0-10% on 100 mesh, 65% on 200 mesh, 90% on 325 mesh, 10% through 325 mesh, and 5% less than 10 microns. In trimodal implementations, a suitable alumina hydrate powder having a median particle size of 9 microns is commercially available under the name Hymod® SB432 CM (J.M. Huber Corp.). Hymod® SB432 CM has a typical chemical analysis of $Al_2O_3$ (64.9%), $SiO_2$ (0.008%), $Fe_2O_3$ (0.007%), total $Na_2O$ (0.2%), soluble $Na_2O$ (0.03%), 34.6% loss on ignition (550° C.), and 0.23% free moisture (105° C.). This material is characterized by a median particle diameter of 9.1 microns, a surface area of 2.15 $m^2$/gm as measured with a Quantachrome monosorb surface area analyzer and a screen analysis of 0.28% on 325 mesh and 99.7% through 325 mesh. In one implementation of the trimodal embodiment according to the invention, the composition comprises a first alumina hydrate powder having a median particle size of about 2 microns, a second alumina hydrate powder having a median particle size of about 9 microns, and a third alumina hydrate powder having a median particle size of about 45 microns.

In addition to the bimodal and trimodal embodiments described above, it is contemplated that any number of powders having different median particle sizes may be employed in the practice of the invention. Accordingly, the invention embraces embodiments having one, two, three or more inorganic fire-retardant powders (e.g. alumina hydrate powders) of differing median particle diameters. In one embodiment, the first and second (or first, second and third) powders are powders of the same inorganic fire-retardant. However, the invention is not so limited an contemplates embodiments where the first and second (or first, second and third) powders are powders independently selected from different inorganic fire-retardants.

Other alumina trihydrate powders having median diameters between about 1 and about 100 microns are commercially available, for example, from the J.M Huber Corporation under the names Hymod®, Onyx Elite® 100, and MICRAL®. With due regard to these commercially available alumina trihydrate powders, it is contemplated that inorganic fire-retardant powders having median particle diameters of, for example, about 1, 1.25, 1.5, 2, 2.6, 3.5, 4, 5, 6, 7, 8, 9, 10, 11, 12, 14.5, 15.5, 16, 18, 18.5, 20, 25, 35, 40, 45, 50, 60, and about 70 will be useful in the practice of the invention.

The compositions of the invention may contain any amount of inorganic fire-retardant. However, it has been found advantageous to include inorganic fire-retardants in the inventive compositions at levels of at least 30% by weight or greater to provide the most desirable fire-retardant and fire-extinguishing properties. It has surprisingly been found that relatively large diameter inorganic fire-retardant powders will remain suspended in aqueous solution in the bi- and tri-modal compositions at levels which would otherwise rapidly precipitate from the aqueous phase and form an undesirable sediment in the absence of smaller diameter powders.

It has been found to be advantageous, but not strictly necessary, to employ a surfactant in the compositions of the invention. The use of a surfactant will allow for even larger amounts of inorganic fire-retardant to be incorporated in the compositions. This expedient will be particularly advantageous where it is desired to employ only large diameter inorganic fire-retardant powders in the inventive compositions. With the use of a surfactant, it is possible to incorporate 30% by weight or more of inorganic fire-retardant powders having median diameters between about 10 and about 100 microns, which would otherwise readily separate from aqueous solution to form an undesirable sediment, even in the absence of smaller diameter particles. Any surfactant may be employed in the practice of the invention. The surfactant may be an anionic surfactant, including, for example, sodium dodecylbenzene sulfate and sodium dodecylbenzene sulfonate or the surfactant may be a nonionic surfactant, such as an alkyl aryl polyethoxy alcohol or an alkyl phenoxy poly(ethyleneoxy) ethanol having alkyl groups of about 7 to about 12 carbon atoms, and the like. Combinations of one or more surfactants are also contemplated to be useful in the practice of the invention. The nonionic octyl phenol ethoxylate surfactant sold under the name TRITON®-X 100 (Rohm & Haas) has been found especially useful. The surfactant will typically be present at about 0.1 to about 5% by weight based on the total weight water (i.e., aqueous latex dispersion plus added water). When a surfactant is present, it is not strictly necessary to employ bimodal or trimodal inorganic fire-retardant powders.

The compositions of the invention typically will comprise at least about 30% by weight inorganic fire-retardant. In other interesting embodiments, the compositions will comprise at least about 40% by weight, at least about 50% by weight, at least about 60% by weight, or at least about 70% by weight inorganic fire-retardant. For maximum fire protection it may be desirable to include inorganic fire-retardants in the compositions at least about 80% by weight or at least about 90% by weight.

In a particularly interesting embodiment of the invention, the compositions are provided as water-resistant, fire-retardant, smoke-suppressing coatings for application to flammable substrates. The coatings are provided as aqueous dispersions having the compositions of the invention dispersed substantially homogenously therein. Accordingly, laborious stirring or agitation of the liquid to re-disperse the inorganic fire-retardant is not required. The liquid coating may be packaged in cans and the like and applied to the substrate by, for example, brushing or spraying.

In some embodiments, the coatings pass the "Surface Burning Characteristics of Building Materials" standard ASTM E84-04 (UL E84) with a flame spread index of 0 and a smoke index of 0. The coatings also pass Fed. Std. 141B, Method 6221 for flexibility with no cracking or checking when bent 180° around a ⅛" mandrel.

The coatings may be applied to any number of substrates including, without limitation, plastic, rubber, metal, composite materials, wood, synthetic fibers, and cellulosics such as, for example cardboard. The advantages of the invention are most fully realized when the substrate is deformable, i.e., flexible, pliable, ductile, etc. Exemplary substrates therefore include, without limitation: pipes; tubes; cables; cords; ropes; wires; hoses; weld blankets; automotive parts including for example; shifter boots, "soft tops," fire walls, interior paneling, etc.; flexible panels; mats; molded plastic articles and the like. Of course, the coatings will be equally useful when applied to rigid substrates.

The coatings may be applied over one or more under-coatings, including for example, intumescent coatings. Accordingly, one embodiment of the invention provides a fire extinguishing system comprising a coating according to the invention applied over one or more under-coatings, wherein at least one coating of the one or more under-coatings comprises an intumescent composition. Suitable intumescent compositions and coatings are well known in the art and include, for example, those disclosed in U.S. Pat. No. 5,035,951 to Dimanshteyn.

In other applications, the coatings are contemplated to be particularly suitable for application to substrates which are subjected to water from condensation, outdoor use, high humidity environments, etc., including, for example, various HVAC components.

In another embodiment of the invention, the compositions are provided in the form a paint, more particularly a latex paint, by incorporating one or more pigments, including for example $TiO_2$, into the formulations described herein. Additional additives well known to the skilled artisan such as pigment-dispersing agents, preservatives, thickeners, defoamers, and freeze-thaw stabilizers may also be included. The paints are advantageously water-resistant and fire-resistant.

EXAMPLE 1

This example provides a bimodal coating according to the invention. A highly flexible water-resistant, fire-retardant, fire-extinguishing coating is formulated according to Table 1.

TABLE 1

| | |
|---|---:|
| UCAR ™ Latex 9042 | 85 lbs |
| water | 27 lbs |
| TRITON ®-X 100 | 2 lbs |
| Onyx Elite ® 100 (45 μm) | 150 lbs |
| MICRAL ® 932 (2 μm) | 50 lbs |

EXAMPLE 2

A cement board was coated with a 15 mil thick coating according to Example 1 and subjected to surface burning testing according to the "Surface Burning Characteristics of Building Materials" standard ASTM E84-04 (UL E84). See *ASTM Fire Standards*, Sixth Edition, ASTM International, Oct. 1, 2004 and *Annual Book of ASTM Standards*, Volume 04.07, November 2004, the contents of which are hereby incorporated by reference in their entirety.

ASTM E84-04 compares surface flame spread and smoke development measurements to those obtained from tests of mineral fiber cement board and select grade red oak flooring standards. The sample is subjected to flame for ten minutes while flame front advance and smoke density measurements are recorded. No ignition of the coated surface was observed during the 10 minute exposure to flame reaching a maximum temperature of 569.3° F. The results of the test are summarized in Table 2.

TABLE 2

| Parameter | Index |
|---|---|
| Max Flame Spread (ft) | 0.0 |
| Flame Spread Index | 0 |
| Smoke Index | 0 |

Based on the foregoing test, the coating is considered a "Class A" building material per UL E84.

EXAMPLE 3

The ability of the coating of Example 1 to resist fire was investigated using a non-asbestos weld blanket substrate. In the absence of the coating, the weld-blanket ignited and evolved large amounts of smoke upon contact with molten metal from a welding torch. A coating according to Example 1 was applied to the same weld blanket. Molten metal was dropped onto the coated weld blanket. No visible ignition or smoking was observed.

EXAMPLE 4

This example provides a trimodal coating composition according to the invention. A highly flexible water-resistant, fire-retardant, fire-extinguishing coating is formulated according to Table 3.

TABLE 3

| UCAR ™ Latex 9042 | 80 lbs |
|---|---|
| water | 30 lbs |
| TRITON ®-X 100 | 3 lbs |
| Onyx Elite ® 100 (45 μm) | 120 lbs |
| Hymod ® SB432 CM (9 μm) | 40 |
| MICRAL ® 932 (2 μm) | 20 lbs |

It will be understood that the recitation of ranges contained herein are as a matter of convenience only and the inventors are in possession of every value intermediate within the ranges. That is, every intermediate value or sub-range within a disclosed range should be understood to be inherently disclosed.

It should thus be understood that this description (including the tables) is only representative of some illustrative example variants. For the convenience of the reader, the above description has focused on a representative sample of all possible permutations and combinations, a sample that teaches the principles of the invention. The description has not attempted to exhaustively enumerate all possible variations, permutations or combinations. That all such variants, permutations or combinations have not been presented or may be available is not to be considered a disclaimer of those variants, permutations or combinations. One of ordinary skill will appreciate that many of those variants, permutations or combinations incorporate the very same principles and can be achieved without undue effort, although in some cases they are literally described herein and in other cases, although not specifically described, are equivalent.

What is claimed is:

1. A fire-retardant composition comprising:
   (a) a latex binder;
   (b) at least about 30% by weight of alumina trihydrate having at least a bimodal distribution of particle sizes comprising:
      (i) a first powder of alumina trihydrate having a first median particle diameter between about 0.1 and about 20 microns, and
      (ii) a second powder of alumina trihydrate having a second median particle diameter between about 5 and about 100 microns;
   wherein said second median particle diameter is larger than said first median particle diameter; and
   (c) a surfactant.

2. The composition of claim 1 wherein said first powder has a median particle diameter between about 1 and about 3 microns.

3. The composition of claim 2 wherein said first powder has a median particle diameter of about 2 microns.

4. The composition of claim 1 wherein said second powder has a median particle diameter between about 10 and about 70 microns.

5. The composition of claim 4 wherein said second powder has a median particle diameter between about 20 and about 60 microns.

6. The composition of claim 5 wherein said second powder has a median particle diameter of about 40 and about 50 microns.

7. A coating consisting essentially of the composition of claim 1.

8. A fire-retardant, smoke-suppressing coating consisting essentially of the composition of claim 1.

9. A fire-extinguishing coating consisting essentially of the composition of claim 1.

10. A water-resistant coating consisting essentially of the composition of claim 1.

11. An adhesive consisting essentially of the composition of claim 1.

12. A flexible barrier consisting essentially of the composition of claim 1.

13. The composition of claim 1, wherein the latex binder is selected from the group consisting of a natural latex polymer; a neoprene latex polymer; a nitrile latex polymer; a vinyl acrylic latex polymer; a styrene acrylic latex polymer; a styrene butadiene latex polymer; a copolymer of methylmethacrylate, styrene, methacrylic acid, and 2-hydroxyethyl acrylate; a copolymer of acrylic acid, methyl methacrylate, styrene, hydroxyethyl acrylate, and butylacrylate; a copolymer of butylacrylate, methyl methacrylate, and hydroxyethyl acrylate; a copolymer of styrene and butylacrylate; a copolymer of butylacrylate, 2-ethylhexyl acrylate, and methacrylic acid; carboxylated styrene butadiene polymers; a copolymer of butyl acrylate, 2-ethylhexyl acrylate, methyl methacrylate, and acrylic acid; a copolymer of butyl acrylate, methyl methacrylate, styrene, methacrylic acid, and 2-hydroxyethyl acrylate; and a copolymer of vinyl acetate and butyl acrylate.

14. The composition of claim 1, wherein the composition comprises water.

* * * * *